United States Patent [19]
Tajima et al.

[11] Patent Number: 5,272,733
[45] Date of Patent: Dec. 21, 1993

[54] CONTROL ROD DRIVING SYSTEM

[75] Inventors: Satoko Tajima; Shinichi Ishizato; Yoshie Hayashi, all of Yokohama, Japan

[73] Assignee: Kabushiki Kaisha Toshiba, Kawasaki, Japan

[21] Appl. No.: 723,330

[22] Filed: Jun. 28, 1991

[30] Foreign Application Priority Data

Jun. 28, 1990 [JP] Japan .................. 2-168546
Nov. 15, 1990 [JP] Japan .................. 2-307014
Jun. 4, 1991 [JP] Japan .................. 3-132828

[51] Int. Cl.$^5$ .................................. G21C 7/06
[52] U.S. Cl. ................. 376/219; 376/310; 376/313
[58] Field of Search ............. 376/219, 313; 370/310

[56] References Cited

U.S. PATENT DOCUMENTS 4,775,471 10/1988 Nagai et al. ................. 376/313
4,880,595 11/1989 Matsuda et al. .............. 376/313
4,980,060 12/1990 Muto et al. .................. 210/321.8

FOREIGN PATENT DOCUMENTS

56-72392 6/1981 Japan.

Primary Examiner—Donald P. Walsh
Assistant Examiner—Frederick H. Voss
Attorney, Agent, or Firm—Oblon, Spivak, McClelland, Maier & Neustadt

[57] ABSTRACT

A control rod driving hydraulic system of a control rod driving system of a nuclear power plant, in utilization of condensate as a control rod driving water comprises a water pressure control unit arranged for each control rod and a water pressure supply unit for commonly supplying water pressure to all control rods. The water pressure supply unit comprising a pump mechanism operatively connected to a condensate supply source for driving the control rod driving water, a filter mechanism operatively connected to the condensate supply source and the pump mechanism for filtering the condensate as the control rod driving water, a valve unit for regulating quantity of flow of the control rod driving water, and a valve unit for regulating pressure thereof. The filter mechanism including at least one hollow fiber filter unit for purifying the control rod driving water. The hollow fiber filter unit includes a backwash regeneration equipment. The filter mechanism includes a suction filter unit and a driving water filter unit, the suction filter unit being connected to the condensate supply unit, the driving water filter unit being connected to the suction filter unit through the pump mechanism and connected to the flow quantity regulating mechanism and the suction filter unit or the driving water filter unit is substituted with the hollow fiber filter unit.

10 Claims, 5 Drawing Sheets

CONTROL ROD DRIVING SYSTEM

BACKGROUND OF THE INVENTION

The present invention relates to a control rod driving system and more particularly to a control rod driving hydraulic system of the control rod driving system for supplying a driving water to a control rod driving mechanism.

Figure 7:
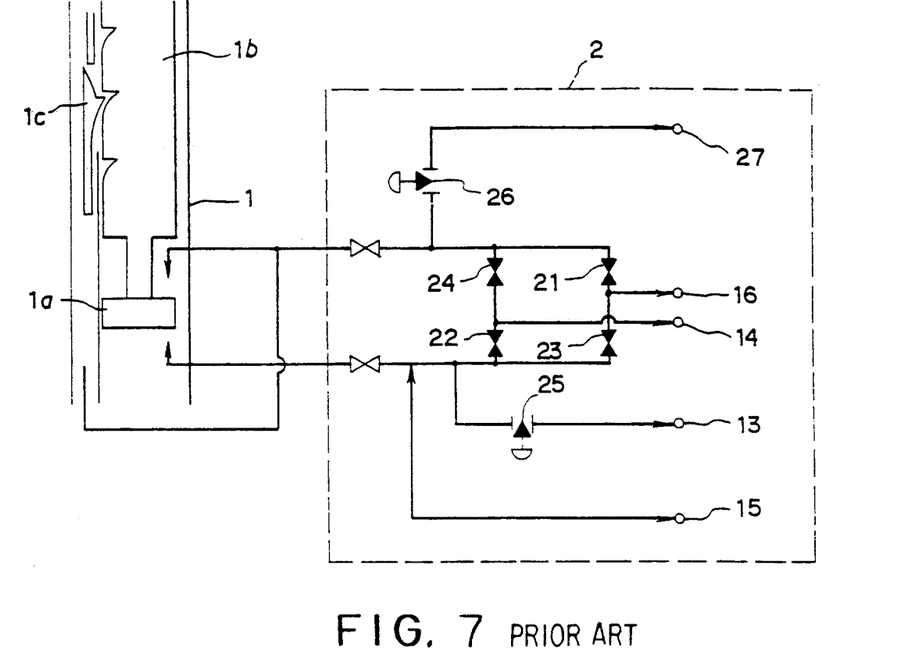
FIG. 7 shows a diagram representing a relationship between a general control rod driving system of a boiling water reactor power plant and a water pressure control unit therefor.

A prior art control rod driving system of a general boiling water reactor plant will be described with reference to FIGS. 7 and 8. FIG. 7 represents the construction of a control rod driving mechanism 1 and a water pressure, i.e. hydraulic, control unit 2, and FIG. 8 represents an outline of a control rod driving hydraulic system.

The control rod driving mechanism 1 employs a hydraulic piston driving system and principally comprises a driving piston 1a, an index tube 1b and a locking mechanism 1c. The driving piston 1a is mounted on a lower portion of the index tube 1b, provided with vertical pressure receiving faces and operates to insert and extract a control rod in accordance with a difference in pressure between the upper and lower surface portions. Further, the index tube 1b is provided with a locking groove on its outer peripheral surface, locked after it's moved by a constant stroke by the locking mechanism 1c such as a ratchet type collet finger or the like, thus holding the control rod fixedly at a predetermined position.

The control rod driving hydraulic system supplies hydraulic pressure and flow necessary for operation of the control rod to adjustment. The system comprises the water pressure control unit 2 attached to each control rod 1 and a control rod driving water pressure supply system common to all control rods.

Figure 8:
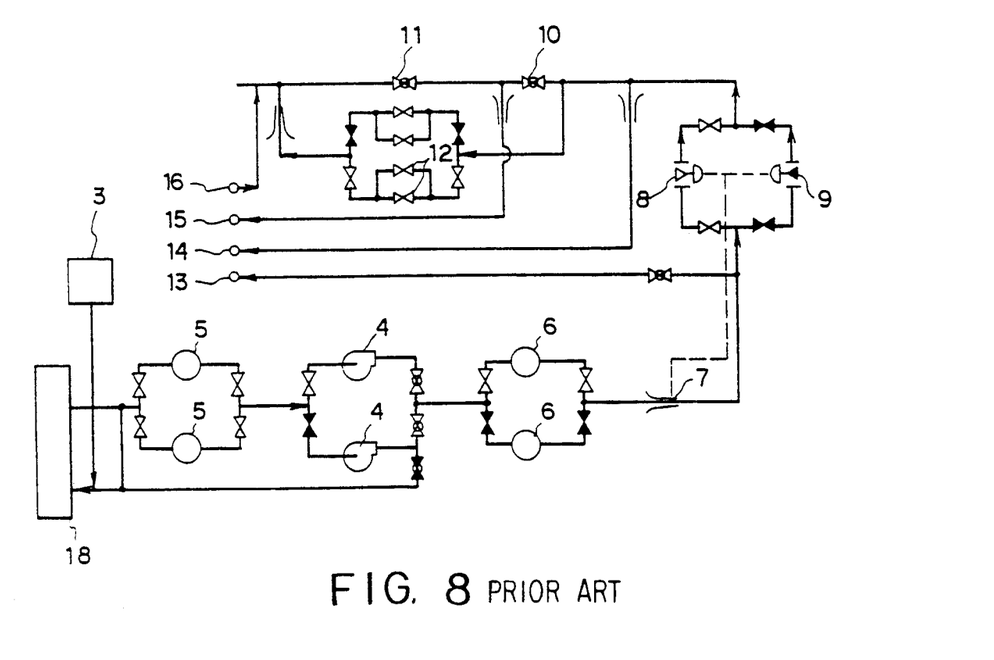
FIG. 8 is a system diagram representing a conventional control rod driving hydraulic system.

The control rod driving hydraulic system is that for supplying a demineralized condensate to the control rod driving mechanism 1 from a condensate demineralizer 3 during operation of the plant, and as shown in FIG. 8, the system comprises principally a driving water pump 4, a suction filter 5, a driving water filter 6, a flow nozzle 7 working as a flowmeter, flow control valves 8 and 9, pressure control valves 10 and 11, stabilizing valves 12 and others. The driving water fed into the driving water pump 4 from the condensate demineralizer 3 flows partly into a charing water header 13 as a scrum water pressure unit by way of two kinds of filters, namely the suction filter 5 and the driving water filter 6, for removing foreign materials which are capable of causing an extra ordinary operation of the control rod driving mechanism 1 and others. Further, it flows partly into a driving water header 14 or a driving hydraulic system for actuating the control rod driving mechanism 1 and partly into a cooling water header 15 of a cooling water pressure system of a control rod driving mechanism piston seal by way of the flow control valves 8 and 9 for retaining a charging water pressure.

The stabilizing valves 12 are constructed of two electromagnetic, i.e. solenoid, valves provided in parallel. A quantity of flow passing one stabilizing valve 12 is normally equal to the quantity of flow necessary for the control rod driving mechanism 1 to insert the control rod, and a quantity of flow passing the other stabilizing valve 12 is adjusted to be equal to the quantity of flow necessary for withdrawal. Water coming out of the stabilizing valves 12 is circulated to the cooling water piping. That is, when the one stabilizing valve 12 is closed at the time of driving operation, a predetermined quantity of flow runs toward the control rod driving mechanism 1, thus operating to keep a hydraulic pressure control valve 10 constant.

Further, a piping from a drain header 16 is connected to the stabilizing valve 12 on the downstream side, water flowing from the driving water header 14 to the drain header 16 by way of the control rod driving mechanism 1 at the time of driving is fed to the cooling water header 15, and then released into a reactor pressure vessel through the other water pressure control unit 2.

At the time of normal operation, only a cooling water flows, a steady flow sufficient enough to cover cooling of all the control rod driving mechanisms 1 runs, and the pipings same in the number of control rods communicate further with each water pressure control unit 2 from each of the headers 13 to 16.

The control rod driving hydraulic system is equipped with a condensate storage tank 18, thus a source of the driving water can be transferred to the condensate storage tank 18 from the condensate demineralizer 3.

The water pressure control unit 2 supplies charging water, cooling water and driving water from the control rod driving hydraulic supply system to the control rod driving system, and is provided in one unit per one control rod.

The water pressure control unit 2 is that of having unitized, as shown in FIG. 7, four directional control valves 21, 22, 23 and 24 and two scrum valves 25 and 26 en bloc.

The water pressure control unit 2 operates as follows.

When inserting the control rod, the insert directional valves 21 and 22 are opened, a hydraulic pressure exerted on the driving water header 14 is provided to a lower surface of the driving piston 1a, and thus water on the upper surface is released to the drain header 16. When extracting, on the contrary, the insert directional control valves 21 and 22 are opened in a short time, the index tube 1b is lifted slighly to an easy unlocking of the collet finger, then the withdraw directional control valves 23 and 24 for withdrawal are opened to apply a driving water pressure to an upper surface of the driving piston 1a, and water on the lower surface is released to the drain header 16. The collet finger is spread out along a guide to separate from the index tube 1b, and is thus ready for extraction of the control rod. Then, by opening the scrum valves 25 and 26 at the time of scrum operation, a high pressure water is poured into the lower surface of the driving piston 1a from the charging water heater 13, water on the upper surface of the driving piston 1a is released to a scrum discharging header 27 of atmospheric pressure, thereby realizing a quick scrum operation.

In the construction described above, by changing a position of the control rod in a reactor core according to a manual control signal, the control rod driving system operates for adjustment of outputs at the time of low output, adjustment of a long term reactivity and control of a core output distribution.

The condensate purified by the filters of the control rod driving water is utilized as purge water for a mechanical seal of a reactor coolant recirculation pump. The mechanical seal is exchanged with another one as an expendable item at every periodical inspection time, but the mechanical seal in use contacts operation water in the reactor, so that the mechanical seal may be radioactive. For this reason, the condensate of a pressure higher than the reactor pressure is used as the purge water to prevent exposure to workers.

In a prior art control rod driving system, two kinds of filters are intended for purifying a driving water of the control rod driving mechanism 1 for driving a control rod and removing foreign materials such as cladding and the like. Namely the suction filter 5 of about 25 μm or so in absolute performance of filtration and the driving water filter 6 of about 50 to 70 μm or so in absolute performance of filtration are provided on an inlet side of the driving water pump 4 for pressurizing the driving water and on an outlet side thereof respectively, thereby filtering the driving water of the control rod driving mechanism 1.

The purified condensate is fed as the purge water for the mechanical seal of the reactor coolant.

However, such performances of filtration are still not satisfactory in removing foreign materials such as cladding and the like thoroughly, and thus are capable of causing the foreign materials to come into the control rod driving mechanism 1 and the water pressure control unit 2. There may cause a case where the biting of the foreign materials to the mechanical seal of the reactor coolant recirculation pump may cause the leakage of the reactor water. Further, there may cause a case where the air comes into the control rod driving hydraulic system at the time of operation for disassembly and check of each equipment and change of a water source, and since the air having come thereinto exerts an influence on a driving performance of the control rod driving mechanism 1, a work for withdrawing the air must be done carefully on each occasion.

SUMMARY OF THE INVENTION

An object of the present invention is to substantially eliminate defects or drawbacks encountered in the prior art described hereinbefore and to provide a control rod driving system capable of enhancing a performance of filtration as high as removing foreign materials which come into a control rod driving hydraulic almost perfectly and air can also be collected, thereby supplying the driving water free from the foreign materials and air to the control rod driving mechanism.

Another object of the present invention is to provide a control rod driving system capable of utilizing regeneratively the filter, reducing frequencies of filter exchanging and reducing secondary waste.

These and other objects can be achieved according to the present invention by providing a control rod driving hydraulic system of a control rod driving system of a nuclear power plant, in utilization of condensate fed from a condensate supply source of the nuclear power plant as a control rod driving water, comprising a water pressure control unit arranged for each control rod and a water pressure supply unit for commonly supplying water pressure to all control rods, the water pressure supply unit comprising a pump means operatively connected to the condensate supply source for driving the control rod driving water, a filter mechanism operatively connected to the condensate supply source and the pump mechanism for filtering the condensate as the control rod driving water, a valve mechanism for regulating quantity of flow of the control rod driving water, and a valve means for regulating pressure of the control rod driving water, the filter means including at least one hollow fiber filter unit for purifying the control rod driving water.

In preferred embodiments, the hollow fiber filter unit includes a backwash regeneration equipment. In detail, the hollow fiber filter unit includes a sealing casing having an interior divided into two sections by a partition plate provided with a plurality of perforations, a bundle of fiber elements passing through the perforations of the partition plate, a drain means connected to the sealing casing and a backwash regeneration equipment connected to the sealing casing. The backwash regeneration equipment includes an air supply unit for supplying air into the sealing casing, a purge air supply pipe connected to the air supply unit and to one section, as a header chamber, of the sealing casing and a bubble air supply pipe connected to the air supply unit and to another section, as a filtering chamber, of the sealing casing.

The filter means includes a suction filter unit and a driving water filter unit, the suction filter unit being connected to the condensate supply unit at one end, the driving water filter unit being connected at one end to another end of the suction filter unit through the pump means and connected at another end to the flow quantity regulating means and the suction filter unit or the driving water filter unit is substituted with the hollow fiber filter unit.

According to the construction of the control rod driving hydraulic system described above, the hollow fiber filter unit is capable of removing an insoluble solid material in the water almost perfectly through the filtration perforations of the hollow fiber filter unit and is not to allow the air to pass therethrough, thus the driving water for the control rod driving mechanism being passed through the hollow fiber filter unit to filtration within the control rod driving hydraulic system, thereby preventing the driving water into which foreign materials such as cladding and others and air are mixed by flowing into the control rod driving mechanism and others. In addition, the mechanical purge water for the reactor coolant recirculation pump can be purified, thus preventing the foreign materials from flowing into the mechanical seal. Furthermore, the hollow fiber filter unit is equipped with the backwash regeneration equipment, so that the filter unit is regeneratively utilized, thus reducing the frequency of exchanging of the filter units and reducing the generation of the secondary waste.

BRIEF DESCRIPTION OF DRAWINGS

In the accompanying drawings.

DESCRIPTION OF THE PREFERRED EMBODIMENTS

Figure 1:
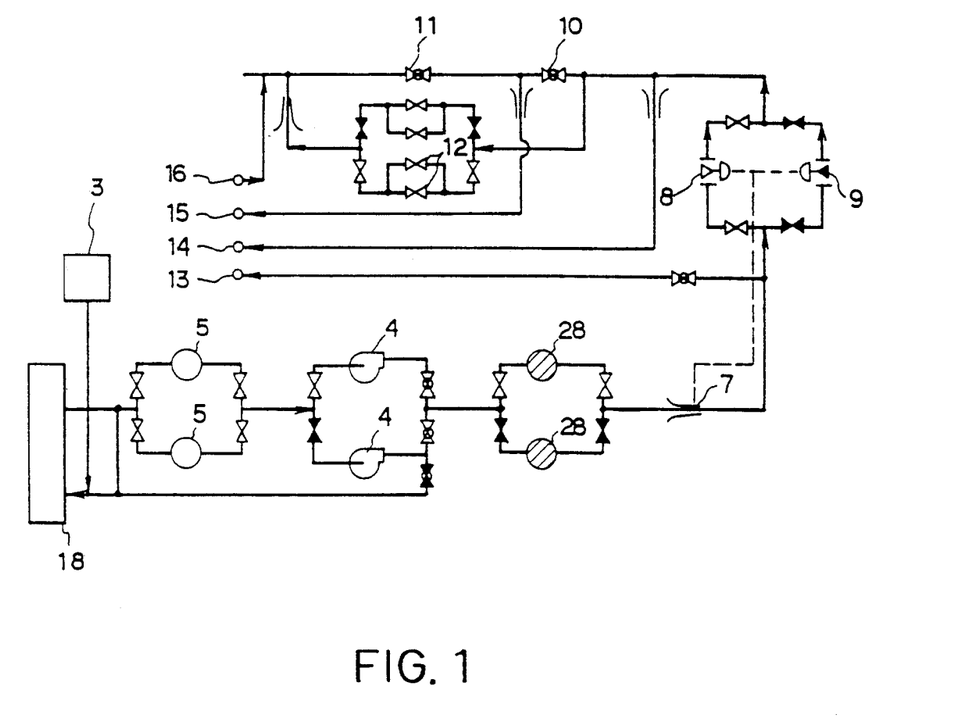
FIG. 1 is a system diagram representing a first embodiment of a control rod driving hydraulic system according to the present invention.

FIG. 1 represents a control rod driving hydraulic system relating to a first embodiment.

The embodiment comprises replacing the driving water filters 6 installed on an outlet side of the driving water pump 4 shown in FIG. 8 as a prior art with hollow fiber filter units 28.

Referring to FIG. 1, during operation of a nuclear power plant, water coming from the condensate demineralizer 3 passes the suction filter 5, and after being pressurized by the driving water pump 4, it passes the hollow fiber filter unit 28, and is partly supplied to the control rod driving mechanism 1 by way of the flow control valve 8 and the pressure control valve 10.

Here, foreign materials such as cladding and others which are mixed into the driving water are removed first from passing the suction filter 5. However, a minute insoluble solid material of about 25 $\mu m$ or below in size cannot be removed through the suction filter 5 and thus comes into the driving water pump 4, and is discharged to the hollow fiber filter unit 28, and the solid material is removed almost perfectly. Accordingly, the driving water which comes out of the hollow fiber filter unit 28 becomes pure and free from foreign materials therein. Thus, an abnormity of extra ordinary operation of the control rod driving mechanism 1 due to biting of foreign materials in the driving water is prevented from arising to maintain a stable driving performance.

In the case of the prior art exemplified in FIG. 8, when equipment is disassembled for plant construction and periodical survey or inspection and a water source is changed from the condensate demineralizer 3 to the condensate storage tank 18, a work for withdrawing the air must be carried out with great care, however, since the hollow fiber filter unit 28 is installed on an outlet (discharge) side of the driving water pump 4 of the control rod driving hydraulic supply system in the embodiment, the air is collected through the hollow fiber filter unit 28. Thus, the aforementioned vent work can sharply be cut down and simplified as well, and therefore a time consuming construction process and a periodical survey process can be reduced, thereby realizing an economical management.

Figure 2:
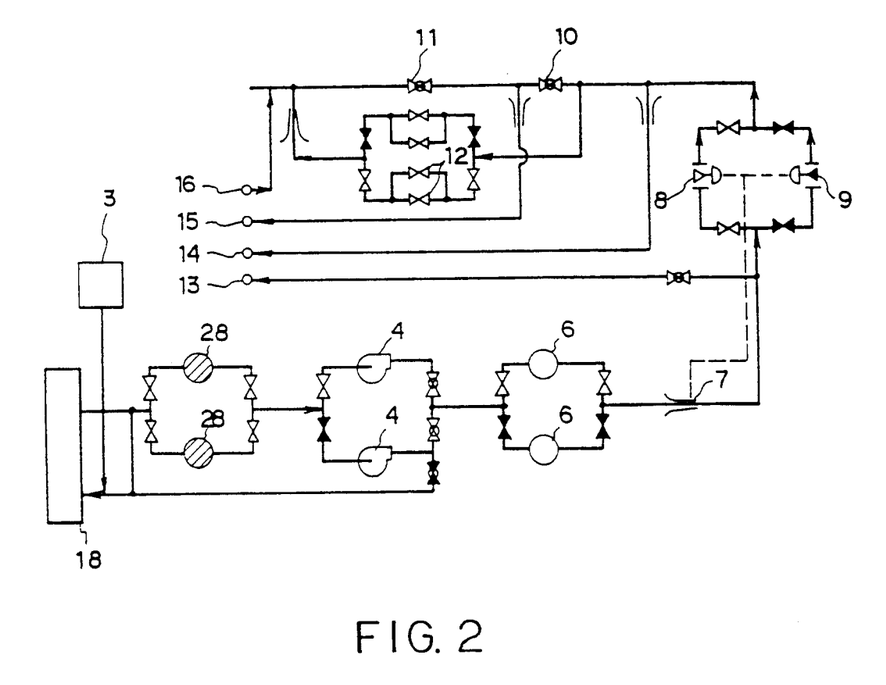
FIG. 2 is also a system diagram representing a second embodiment of a control rod driving hydraulic system of the present invention.

FIG. 2 represents a second embodiment of the control rod driving hydraulic system relating to the present invention, and this embodiment comprises replacing the suction filters 5 provided on an inlet side of the driving water pump 4 in the case of prior art exemplified in FIG. 8 with the hollow fiber filter units 28. The remaining construction is not different from that of FIG. 8, Therefore a further description will be omitted here.

A driving water from the condensate demineralizer 3 passes the hollow fiber filter unit 28 before entering the driving water pump 4, foreign materials being removed therethrough.

Since the driving water having the foreign materials removed as above comes into the driving water pump 4 in this case, a performance of each equipment can be maintained as preventing the biting of the foreign materials to the driving water pump 4.

The hollow fiber filter unit 28 collects the air as in the case of control rod driving device given in the first embodiment, therefore the air generated on an upstream side of the hollow fiber filter unit 28 is prevented from flowing into the piping, the control rod driving mechanism 1 and the water pressure control unit 2, and the vent work for withdrawing the air can sharply be cut to realize an economical management.

In the above embodiments, the two driving water filters 6 and the two suction filters 5 are substituted with two hollow fiber filter units 28, respectively, only ones of them 6 and 5 may be substituted with the filter unit 28.

Figure 3:
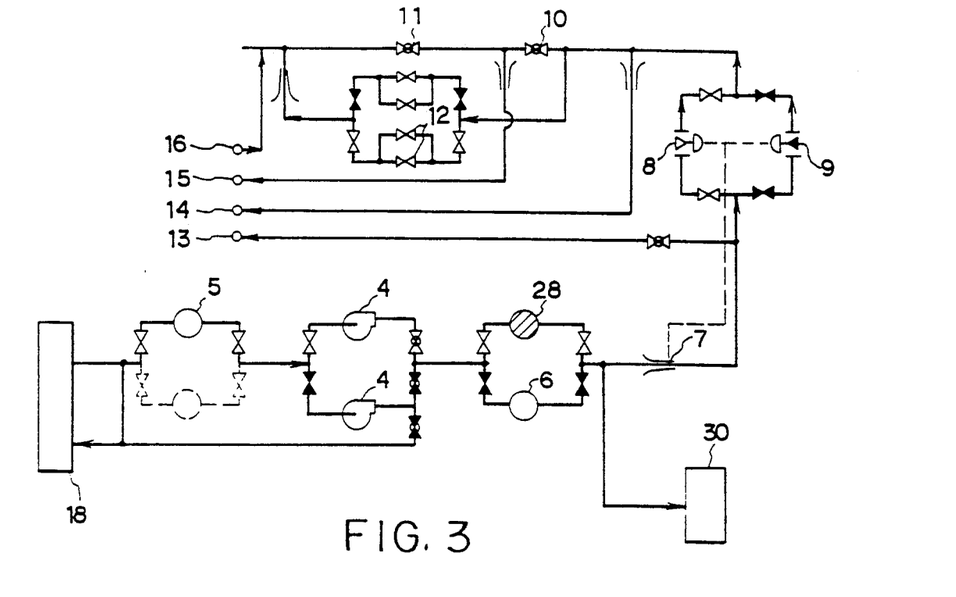
FIG. 3 is also a system diagram representing a third embodiment of a control rod driving hydraulic system of the present invention.

FIG. 3 represents a control rod driving hydraulic system relating to a third embodiment according to the present invention, in which like reference numerals are added to elements or unit corresponding to those of the first and second embodiments and in which one of the driving water filters 6 in FIG. 8 installed on an outlet side of the driving water pump 4 is substituted with a hollow fiber filter 28. The other one of the filters 6 is of a conventional knotting-wire type filter.

Figure 4:
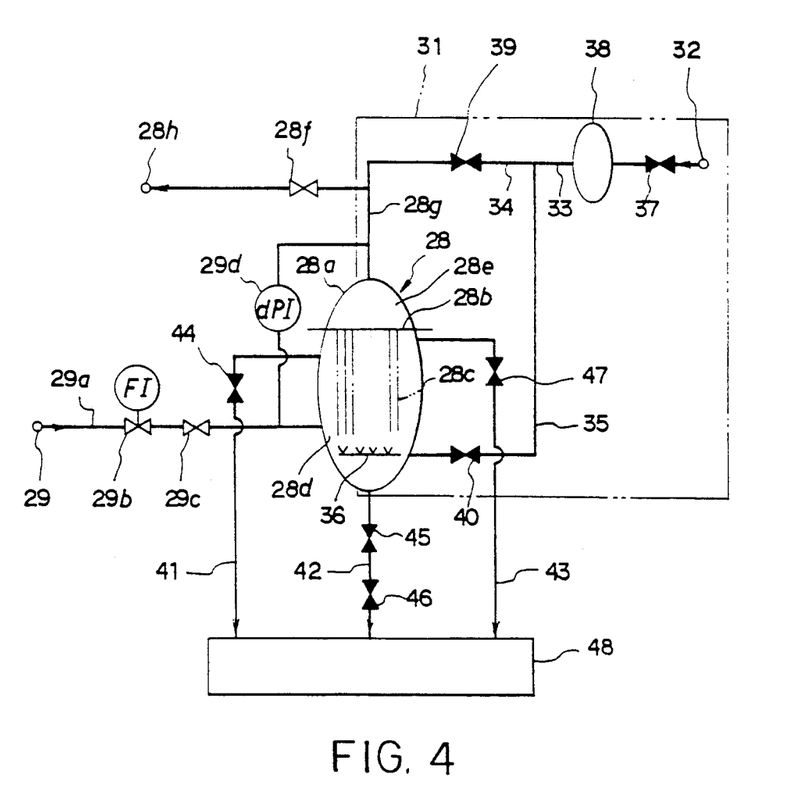
FIG. 4 is a diagram showing a hollow fiber filter unit equipped with a backwash regeneration equipment.

As shown in FIG. 4, a hollow fiber filter unit 28 is provided with a sealing casing 28a which is divided into upper and lower sections by a partition plate 28b provided with a number of perforations. Filter elements 28c each is composed of a number of hollow fibers each passing the perforation of the partition plate 28b. The driving water fed into a lower filtering chamber 28d of the sealing casing 28a is filtered by the filament elements 28c, and thereafter, the driving water is drained to an outlet unit 28h via an upper header chamber 28e and a drain pipe 28g provided with an open/close valve 28f.

An inlet pipe 29a is connected to the driving water filter unit 28 so as to feed the driving water from the inlet unit 29, and a flow meter 29b and an open/close valve 29c are provided for the inlet pipe 29a. A differential monometer 29d is provided for a duct connecting the inlet pipe 29a and the drain pipe 28q.

In this embodiment, water coming from the condensate storage tank 18 passes the suction filter 5 and after being pressurized by the driving water pump 4, it passes the hollow fiber filter unit 28 via the inlet pipe 29a and then, through the drain pipe 28g, is partly supplied to the control rod driving mechanism 1 by way of the flow control valve 8 and the pressure control valve 10.

Here, foreign materials such as cladding and others which are mixed into the driving water is removed first from passing the suction filter 5. However, a minute insoluble solid material of about 25 $\mu m$ or below in size cannot be removed through the suction filter 5 and thus comes into the driving water pump 4, and is discharged to the hollow fiber filter unit 28 from the pump 4. A cladding of about 0.1 $\mu m$ or so is picked up through the hollow fiber filter unit 28 and the solid material is removed almost perfectly. Accordingly, the driving water which comes out of the hollow fiber filter unit 28 becomes pure free from foreign materials therein. Thus, an abnormity of extra ordinary operation of the control rod driving mechanism 1 due to the biting of the foreign materials in the driving water is prevented from arising to maintain a stable driving performance.

The purge water for the mechanical seal of the reactor coolant recirculation pump 30 is branched from the control rod driving water system, so that when the control rod driving water is made clean, the purge water for the mechanical seal of the recirculation pump 30 can be also cleaned simultaneously. Accordingly, the biting of the foreign materials to the mechanical seal can be substantially prevented, thus reducing the leakage of water.

In the case of the prior art exemplified in FIG. 8, when equipment is dissembled for plant construction and periodical survey or inspection and a water source is changed from the condensate demineralizer 3 to the condensate storage tank 18, a work for withdrawing the air must be carried out with great care, however, since the hollow fiber filter unit 28 is installed on an outlet (discharge) side of the driving water pump 4 of the control rod driving hydraulic supply system in the embodiment, the air is collected through the hollow fiber filter unit 28. Thus, the aforementioned vent work can sharply be cut down and simplified as well, loads of a construction process and a periodical survey or inspection process can be reduced, thereby realizing an economical management.

The backwash regeneration equipment for the hollow fiber filter unit 28 will be described hereunder with reference to FIG. 4.

Referring to FIG. 4, the backwash regeneration equipment 31 is provided with an air supply tube 33 led from an air inlet 32, and the air supply tube 33 is branched into two branch tubes on the way thereof, one being communicated with the header chamber 28e of the sealing casing 28 as an air purge duct 34 and the other being communicated with the filtering chamber 28d as a bubble supply duct, 35. The filtering chamber 28d is provided with a perforated bubble generation member 36, composed of a perforated tube, connected to the bubble duct 35.

The air supply tube 33 is equipped with an open/close valve 37 and an air filter 38, and the air purge duct 34 and the bubble supply duct 35 are also equipped with open/close valves 39 and 40, respectively.

A plurality, three, for example, of drain pipes 41, 42 and 43 are connected to the filtering chamber 28d of the hollow fiber filter unit 28 to portions of different levels, and these drain pipes 41, 42 and 43 are connected to a radioactive waste disposal unit 48 through open/close valves 44, 45, 46 and 47.

In the hollow fiber filter unit 28 of the characters described above, during the water supply through the condensate storage tank 18, the quantity of the cladding caught by the fiber filament element 28c is gradually increased. This fact of increasing of the quantity of the cladding caught can be confirmed by the supply water quantity measurement by the flowmeter 29b and the pressure difference measurement by the differential manometer 29d between the inlet pipe 29a and the drain pipe 28g.

When these measurement values reach predetermined reference values, it is discriminated that the washing of the hollow fiber filter unit 28 should be made.

At the washing time of the hollow fiber filter unit 28, the driving water supply pump 4 first stops and the open/close valves 29c and 28f of the inlet pipe 29a and the drain pipe 28g are closed. In the next stage, the open/close valves 44 and 47, which are disposed for the drain pipes 41 and 43 disposed to high level positions of the hollow fiber filter unit 28, are made open thereby to drain the water in the unit 28 so that the water level therein is lowered below the partition plate 28b.

In this operation, the open/close valves 37 and 39 of the air supply pipe 33 and the air purge duct 34 are made open and the pressurized air is supplied from the air inlet 32 to an upper portion of the sealing casing 28a of the hollow fiber filter unit 28, thus draining smoothly. The supply of the pressurized air makes swollen the filter elements 28c.

Under this condition, the open/close valve 40 of the bubble supply duct 35 made open and the bubbling operation is performed in the filtering chamber 28d by the air supply to the bubble generation member 36. According to this bubbling, the cladding adhering on the outer surface of the filter elements 28c is removed, thus performing the backwash regeneration treatment.

After the removal of the cladding by the bubbling for a predetermined time, the open/close valves 45 and 46 of the drain tube 42 are opened and the water in the filtering chamber 28d is drained into the radioactive waste disposal equipment 48.

Thereafter, the valves opened for the backwash operation are closed and the valves such as the valve 29c opened during the backwash operation are then closed. The filtering operation of the driving water is then again carried out.

According to this embodiment, the frequencies of the exchanging of the filter elements 28c of the hollow fiber filter unit 28 can be significantly reduced by this backwash regeneration process and the quantity of the secondary radioactive waste can be hence reduced.

In addition, since it is possible to regenerate the filter elements 28c, it is not necessary to limit the water source to the condensate subjected to the demineralizing process carried out by the condensate demineralizing unit.

In the meantime, according to this embodiment, one conventional knotting-wire type filter unit 6 and one hollow fiber filter unit 28 are arranged in parallel for two control rod driving water filters. Since it is necessary for the hollow fiber filter unit 28 to be periodically exchanged with the other one, the knotting-wire type filter unit 6 is used at a time of exchanging the hollow fiber filter unit 28, whereas the hollow fiber filter unit 28 is utilized at a time other than exchanging time. Namely, the cladding adheres to the hollow fiber filter even if the filter is not used for the actual driving water filtering operation, and accordingly, it is necessary to periodically exchange the hollow fiber filter even if not used, resulting in the troublesome workings and demerit in economy as well as increasing of the waste. On the other hand, the knotting-wire type filter can be used for a long time and only a short time is required for the exchanging of the hollow fiber filter. Based on the above technical facts, according to this embodiment, since the conventional knotting-wire type filter is utilized only at a time of the exchanging of the hollow filler filter, the generation of the waste can be reduced and the working of the operator can also be reduced as well as the economical merit. The arrangement of the two types of filters may prevent, reduce the simultaneous operation function problem of two filters in comparison with the usage of the same type.

A fourth embodiment according to the present invention will be described hereunder with reference to FIG. 5, in which like reference numerals are added to elements or parts corresponding to the aforementioned embodiments and the description thereof is made simple or omitted.

Figure 5:
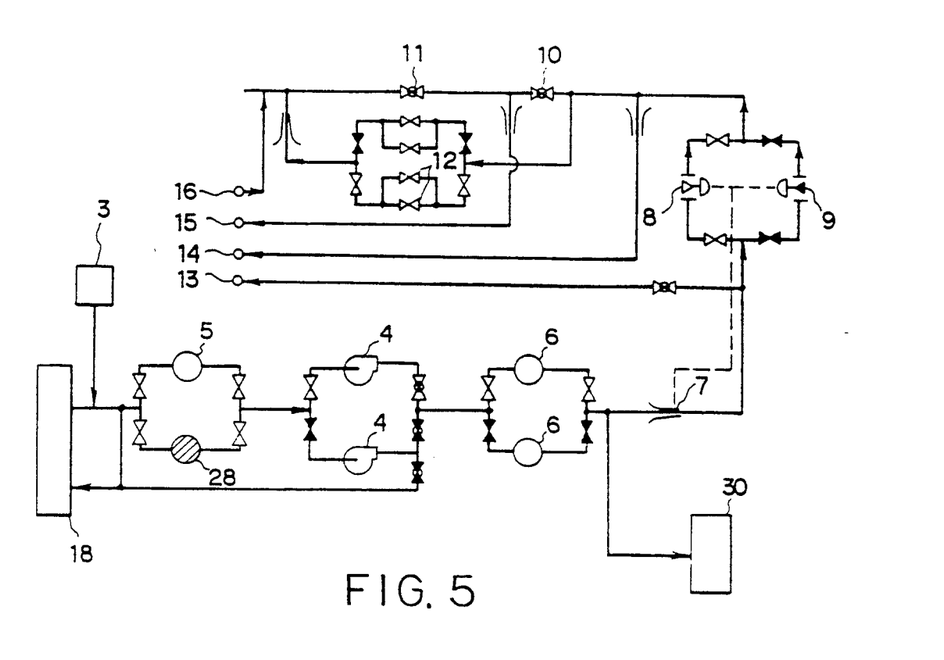
FIGS. 5 and 6 are also system diagrams representing fourth and fifth embodiments of control rod driving hydraulic systems of the present invention.

In the embodiment of FIG. 5, one of the suction filters 5 disposed on the inlet side of the driving water pump 4 shown in FIG. 8 is substituted with a hollow fiber filter unit 28.

The driving water from the condensate demineralizer 3 passes the hollow fiber filter unit 28 just before the entrance into the driving water pump 4 to thereby remove foreign materials.

According to this construction or arrangement, substantially the same effects and functions as those attained by the third embodiment can be achieved. In this embodiment, furthermore, since the driving water after the removal of the foreign materials enters the driving water pump 4, the biting of the foreign materials in the driving water pump 4 can be prevented, thus effectively maintaining the performance of the other elements or parts.

A fifth embodiment according to the present invention will be described hereunder with reference to FIG. 6, in which like reference numerals are added to elements or parts corresponding to the aforementioned embodiments and the description thereof is made simple or omitted.

Figure 6:
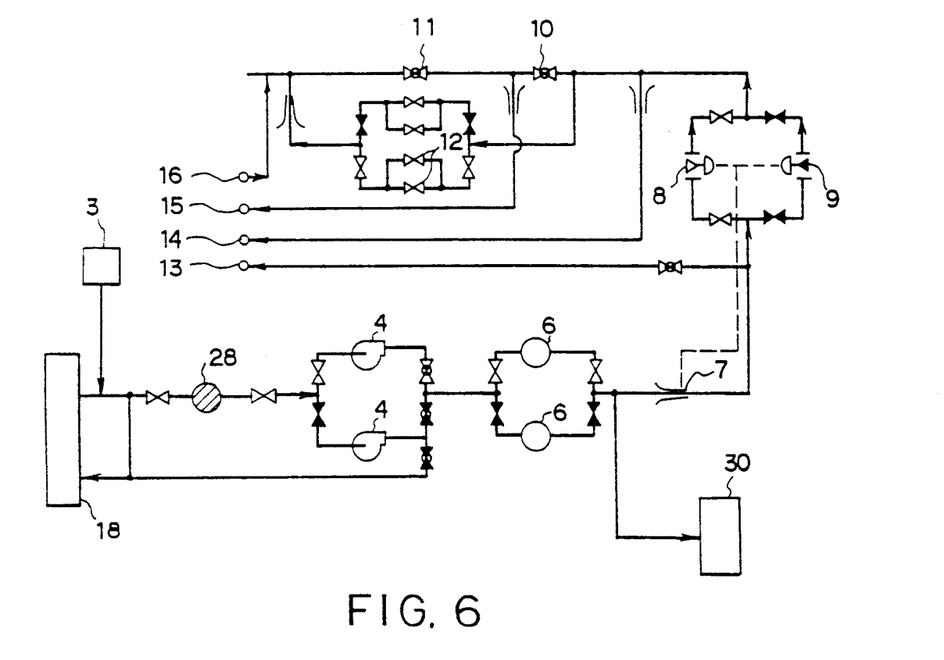

In a case where only one suction filter 5 is disposed, the embodiment of FIG. 6 represents a case in which this one suction filter 5 disposed on the inlet side of the driving water pump 4 is substituted with a hollow fiber filter unit 28, and accordingly, in this embodiment, no suction filter is arranged.

It is to be noted that according to this fifth embodiment substantially the same effects and functions as those attained by the former embodiment can be achieved.

In the foregoing disclosures, the embodiments represented by FIGS. 3, 5 and 6 are mentioned with reference to FIG. 4, it is to be easily understood that the hollow fiber filter unit of FIG. 4 may be applicable to the embodiments of FIGS. 1 and 2 with minor but not substantial modification.

It is also to be understood by persons in this art that the present invention is not limited to the described embodiments and other changes or modifications may be within the scope of the appended claims.

What is claimed is:

1. A control rod driving hydraulic system of a control rod driving system of a nuclear power plant, in utilization of condensate fed from a condensate supply source of the nuclear power plant as a control rod driving water, comprising a water pressure control unit arranged for each control rod and a water pressure supply unit for commonly supplying water pressure to all control rods, said water pressure supply unit comprising:

a pump means operably connected to the condensate supply source for driving the control rod driving water;

means for regulating quantity of flow of the control rod driving water;

means for regulating pressure of the control rod driving water; and a filter means operably connected to the condensate supply source and said pump means for filtering the condensate as the control rod driving water, said filter means including at least one hollow fiber filter unit for purifying the control rod driving water and said filter means includes a suction filter unit and a driving water filter unit, said suction filter unit being connected to the condensate supply unit at one end, said driving water filter unit is connected at one end to another end of the suction filter unit through the pump means and connected to the flow quantity regulator, said suction filter unit being substituted with the hollow fiber filter unit.

2. The control rod driving hydraulic system according to claim 1, wherein said hollow fiber filter unit includes a backwash regeneration equipment.

3. The control rod driving hydraulic system according to claim 1, wherein said hollow fiber filter unit includes a sealing casing having an interior divided into two sections by a partition plate provided with a plurality of perforations, a bundle of filament fiber elements passing through the perforations of the partition plate, a drain mechanism connected to the sealing casing and a backwash regeneration equipment connected to the sealing casing.

4. The control rod driving hydraulic system according to claim 3, wherein said backwash regeneration equipment includes an air supply unit for supplying air into the sealing casing, a purge air supply pipe connected to the air supply unit and to one section, as a header chamber, of the sealing casing and a bubble air supply pipe connected to the air supply unit and to another section, as a filtering chamber, of the sealing casing.

5. The control rod driving hydraulic system according to claim 1, wherein said suction filter unit includes two suction filters which are substituted with two hollow fiber filter units.

6. The control rod driving hydraulic system according to claim 1, wherein said suction filter unit includes two suction filters one of which is substituted with one hollow fiber filter unit.

7. The control rod driving hydraulic system according to claim 1, wherein said suction filter unit includes one suction filter which is substituted with the hollow fiber filter unit.

8. The control rod driving hydraulic system according to claim 1, wherein said suction filter unit is connected to the condensate supply unit at one end, said driving water filter unit is connected at one end to another end of the suction filter unit through said pump means and connected at another end to the flow quantity regulating means and wherein said driving water filter unit is substituted with the hollow fiber filter unit.

9. The control rod driving hydraulic system according to claim 1, wherein said driving water filter unit includes two driving water filters which are substituted with two hollow fiber filter units.

10. The control rod driving hydraulic system according to claim 1, wherein said driving water filter unit includes two driving water filters one of which is substituted with one hollow fiber filter units.

* * * * *